United States Patent [19]

Gloe et al.

[11] Patent Number: 5,115,735
[45] Date of Patent: May 26, 1992

[54] PRESS WITH CONTROL CIRCUIT ARRANGEMENT

[75] Inventors: Karl-Heinz Gloe, Reichelsheim; Helmut Kreuzer, Munster; Harald Biehl, Bensheim, all of Fed. Rep. of Germany

[73] Assignee: AMP Incorporated, Harrisburg, Pa.

[21] Appl. No.: 544,451

[22] Filed: Jun. 27, 1990

[51] Int. Cl.⁵ .............................................. B30B 15/26
[52] U.S. Cl. ........................................ 100/43; 100/48; 100/99; 100/231; 100/292; 318/369
[58] Field of Search ................ 100/43, 48, 49, 53, 100/99, 291, 292, 231; 364/476; 318/369, 626

[56] References Cited

U.S. PATENT DOCUMENTS

| | | | |
|---|---|---|---|
| 3,184,950 | 5/1965 | Litz . | |
| 3,906,315 | 9/1975 | Gotisar | 318/369 X |
| 4,062,213 | 12/1977 | Schneider et al. | 100/43 X |
| 4,246,523 | 1/1981 | Nagai | 100/48 X |
| 4,438,377 | 3/1984 | Sakai et al. | 318/369 X |
| 4,691,653 | 9/1987 | Neki et al. | 318/369 X |

FOREIGN PATENT DOCUMENTS

| | | | |
|---|---|---|---|
| 56-76812 | 6/1981 | Japan | 318/626 |
| 58-13500 | 1/1983 | Japan | 100/43 |
| 59-189100 | 10/1984 | Japan | 100/43 |

Primary Examiner—Harvey C. Hornsby
Assistant Examiner—Stephen F. Gerrity
Attorney, Agent, or Firm—Eric J. Groen; Bruce J. Wolstoncroft

[57] ABSTRACT

A press (2) having a three phase, brushless, direct current drive motor (26) driving a press ram (22) by a way of an eccentric shaft (78) is provided with a control circuit arrangement (89) comprising an incremental encoder (30) for measuring the angular position of the drive shaft (78), and Hall effect sensors (94) for continuously measuring the speed of the drive motor (26). The control circuit arrangement (89) also comprises a computer (108) having registered therein a desired motor speed program (112), and a motor control circuit (104) for comparing the outputs of the encoder (30) and the sensors (94) with the program (112) and feeding the result of the comparison to a motor drive pulse generator (96) to control the speed of the motor (26) in accordance with the program (112) and to stop motor (26) upon the press ram (22) reaching a position at least proximate to its home position (0°) at the end of a cycle thereof.

9 Claims, 9 Drawing Sheets

PRESS WITH CONTROL CIRCUIT ARRANGEMENT

FIELD OF THE INVENTION

This invention relates to a press and in particular to a press for driving an applicator for crimping electrical terminals to leads, the press having a control circuit arrangement for stopping the press ram at least proximate to a home, or top dead center, position at the end of each cycle of operation of the ram.

BACKGROUND OF THE INVENTION

A press of this kind does not have the disadvantages of most conventional presses which are provided with a single revolution clutch for the purpose of ensuring that the press ram carries out only a single cycle of operation each time an electric motor for driving the press ram is actuated. These disadvantages are, mainly, that the press is noisy and jerky in operation and that the single revolution clutch does not reliably ensure that t press ram does not substantially over-run its home position at the end of each cycle of operation. Also, the clutch is unduly subject to wear.

There is described in DE-A-3320023, a press comprising a direct current drive electric motor connected to a slide ram of the press by way of reduction gearing and an eccentric drive shaft, and a control circuit arrangement comprising an incremental encoder for producing a first output representing the angular position of the drive shaft, and thus the linear position of the slide ram and means for controlling the speed of the drive motor to stop the slide ram at least proximate to the home position thereof at the end of each cycle of operation of the slide ram.

The control circuit arrangement of this known press does not serve continuously to monitor the speed of the motor and does not apply a corrective signal to the motor until an overshoot or an undershoot of the press ram has already occurred, so that the ram is not stopped proximate to its home position until several cycles of the press have been carried out.

It is important that the ram should be returned to its home position, that is to say to its fully raised position, with reasonable precision following each cycle of its reciprocating movement, because, for example, the feed finger, of an electrical terminal applicator driven by the press will be incorrectly synchronized with the end positions of the ram of the applicator, should that ram, which is driven by the slide ram of the press, either overshoot or undershoot with respect to its home position at the end of a crimping cycle. Further, any significant overshoot of the slide ram of the press, could cause the ram of the applicator to obstruct the insertion of a lead, to which a terminal is to be crimped during the next ram cycle, between the crimping die and the crimping anvil of the applicator. Proper return of the press slide ram, to its home position at the end of each cycle, is of enhanced importance, where the applicator is part of a lead making machine having automatic lead insertion means which must be synchronized with the cycle of the applicator ram. Further, where the applicator is a stripper crimper, stripping means thereof must also be coordinated with the movement of the applicator ram.

SUMMARY OF THE INVENTION

According to the present invention, a press as defined in the third paragraph of this specification, is characterized by measuring means for producing a continuous second output representing the speed of the drive motor, the computer having registered therein a desired motor speed program, a motor control circuit for comparing said first and said second outputs with said program to provide a third output representing the result of such comparison, and a motor drive circuit, sensitive to s id third output to control the speed of the motor in accordance with the desired motor speed program.

The speed of the drive motor is, therefore, controlled throughout the whole of the ram cycle so that the ram is stopped with the desired accuracy at least proximate to its home position as from the first cycle of operation thereof. Even when the control circuit arrangement of the known press has stabilized the stopping position of the press ram, such stability could be disturbed by an outside influence, for example a damaged terminal on the anvil of the applicator, or no terminal being present thereon, when the ram descends. Since, according to the present invention, the speed of the motor is monitored throughout each ram cycle, such destabilization of the stopping position of the press ram, thus of the applicator ram, and cannot occur.

Advantageously, the drive motor is a three phase pulse-fed, brushless, synchronous motor, which is maintenance-free, the measuring means comprising Hall effect sensors for producing pulse trains, the speed of the drive motor being a function of the pulse frequency. In order to stop the motor when the press ram is at least proximate to its home position, the motor drive circuit may be actuated by the motor control circuit to apply feed pulses of reversed polarity to the drive motor, so that no specific motor brake arrangement, as provided in the known press, is required.

The control circuit arrangement may be provided with a control panel connected to the computer and having switch means actuable to cause the computer to signal the motor control circuit to actuate the motor drive circuit to apply a single continuous pulse to a phase of the drive motor to hold it in a stopped position. The control panel may have a further switch means, actuable to cause the motor to crawl forwardly and rearwardly, at reduced speed, and thus to cause the press ram to rise and fall slowly, when the press, or a lead-making machine of which the press is a part, is to be set up.

Means may also be provided for ensuring that motor control circuit can supply control signals to the motor drive circuit only with a rapidity that is compatible with the following capacity of the drive motor.

Sensor means may be connected to the computer for sensing the absence of a terminal on the anvil of the applicator and in the absence thereof to cause the computer to actuate the motor control circuit to activate the motor drive circuit to cause the motor to drive the slide ram of the press through two cycles of operation so that the next following terminal is placed on the anvil, to be crimped to a lead by the dies of the applicator ram.

BRIEF DESCRIPTION OF THE DRAWINGS

For a better understanding of the invention and to show how it may be carried into effect reference will now be made by way of example to the accompanying drawings in which;

FIG. 5 is an enlarged isometric view of a bearing ring which is shown in FIGS. 2, 3 and 8;

DETAILED DESCRIPTION OF THE INVENTION

The mechanical construction of the press will now be described with particular reference to FIGS. 1 to 10.

Figure 1:
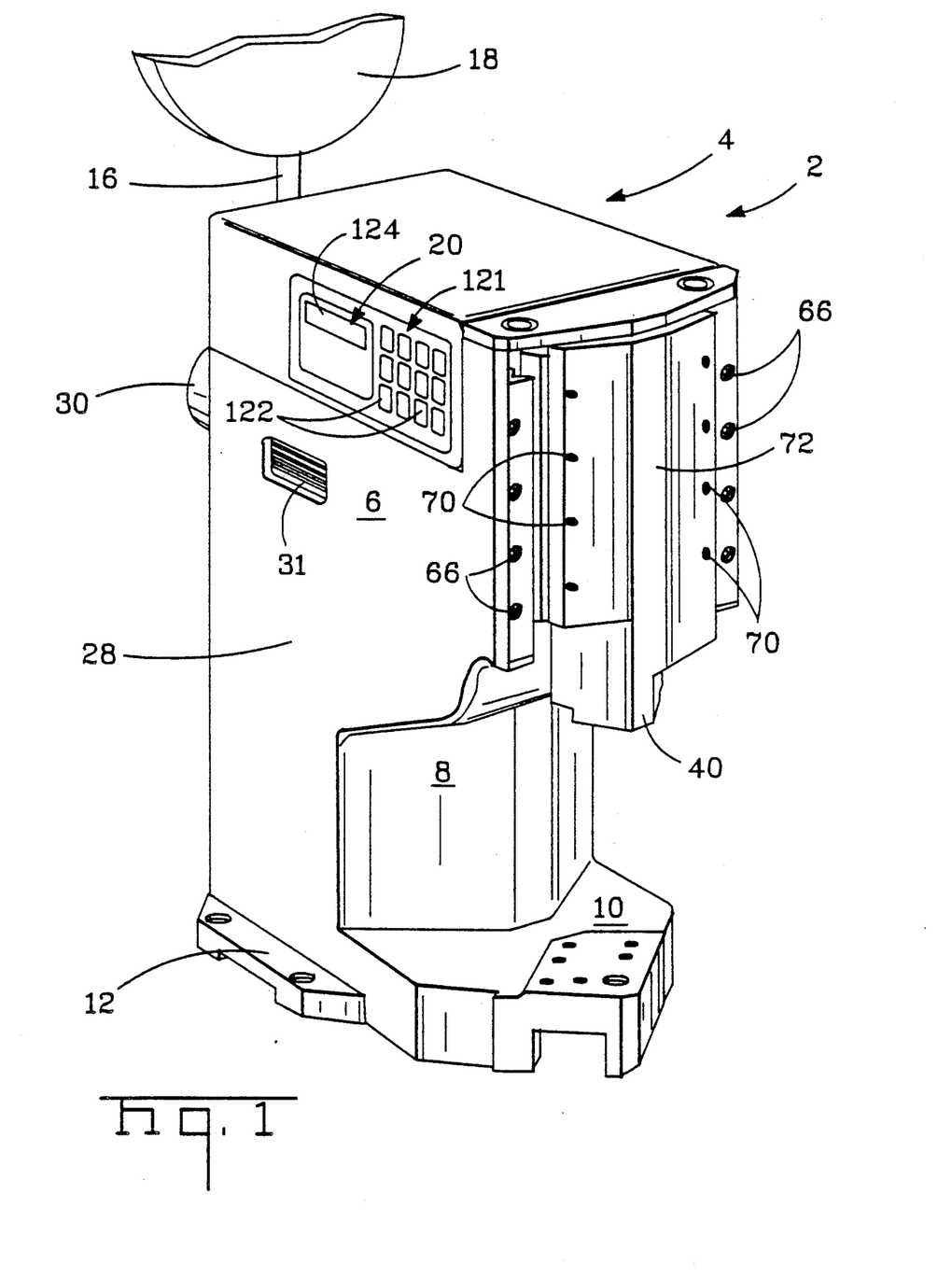
FIG. 1 is an isometric view of an electronically controlled crimping press having a slide ram, which is shown in a fully raised, home position.
Figure 2:
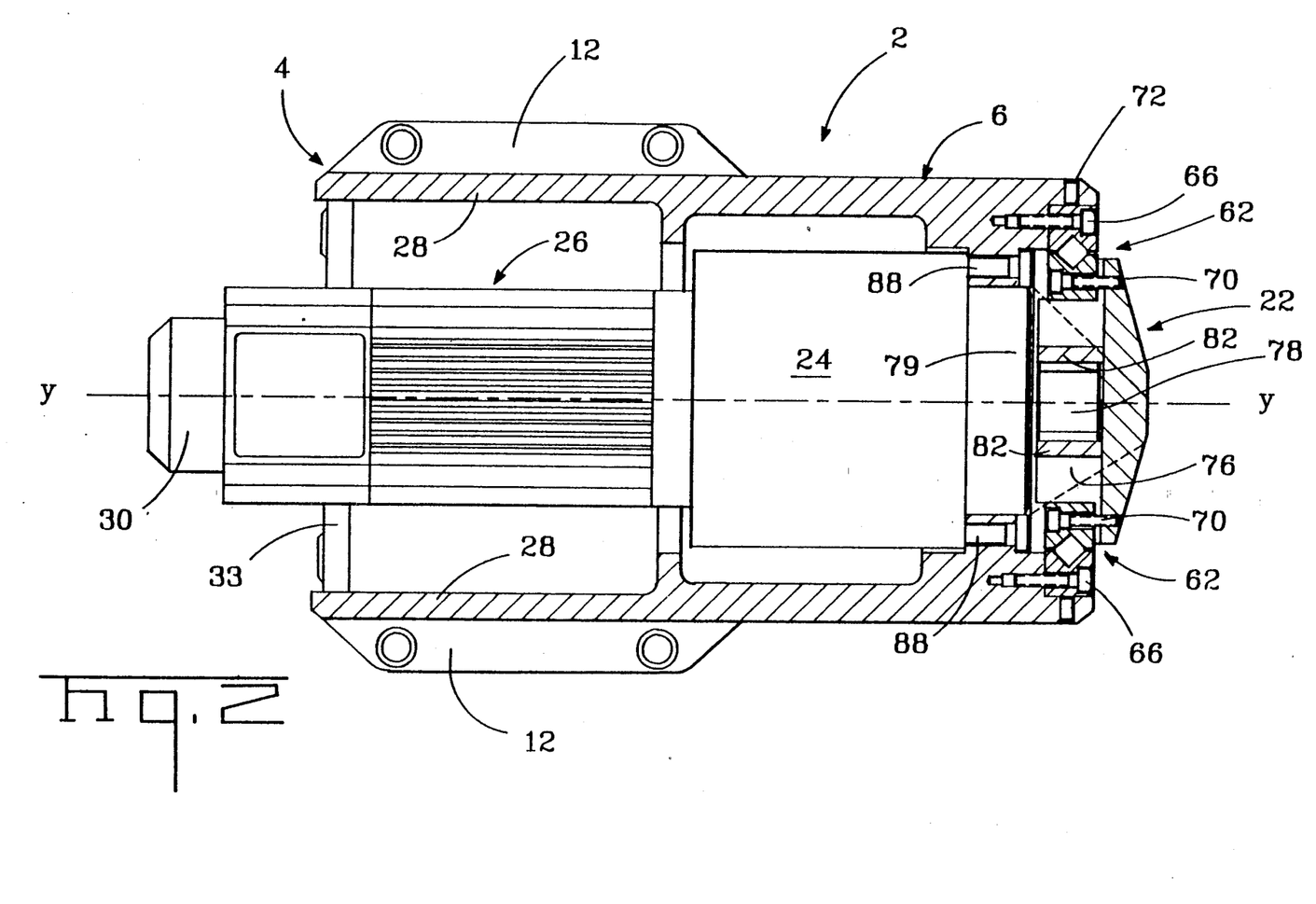
FIG. 2 is an enlarged top plan view of the press shown mainly in section.
Figure 7:
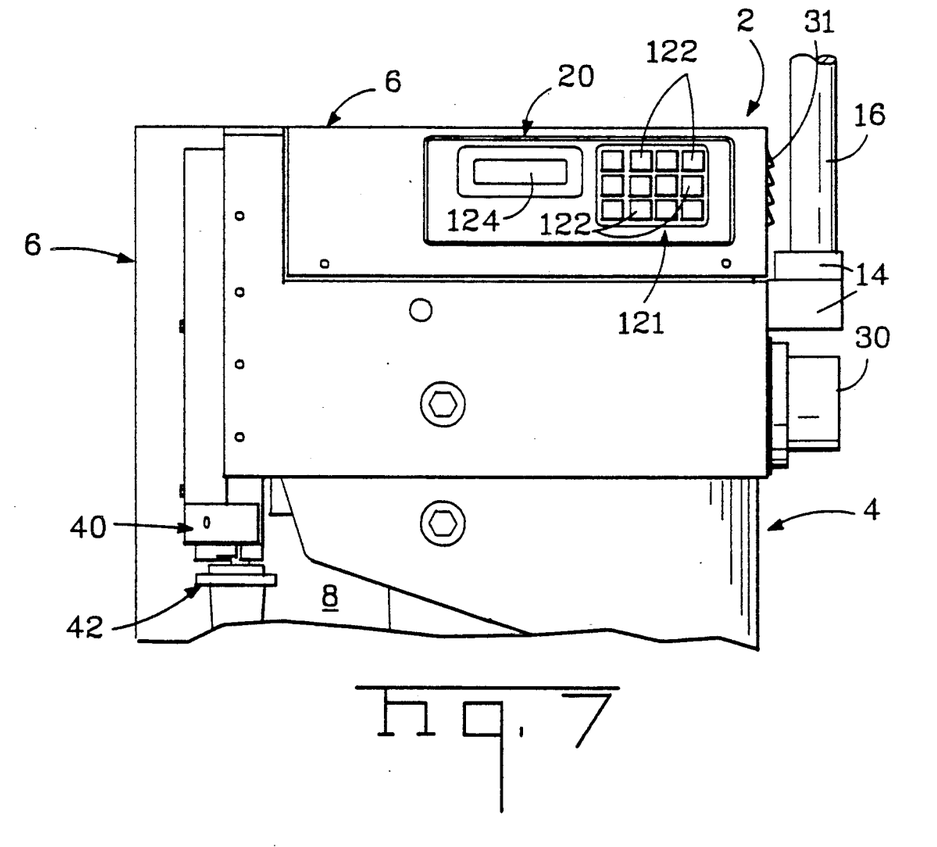
FIG. 7 is an enlarged fragmentary side view of the upper part press.
Figure 11:
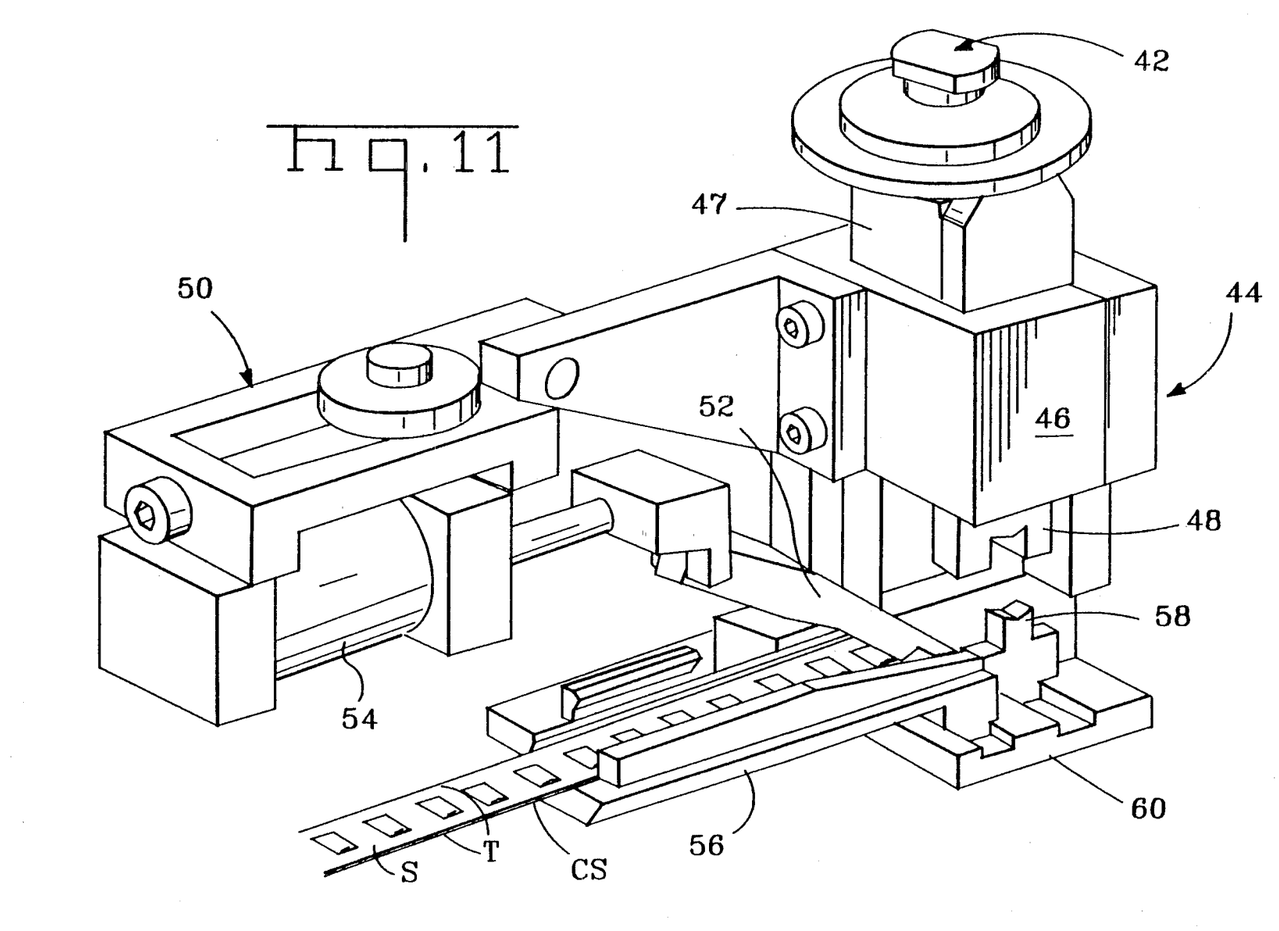
FIG. 11 is an isometric view of one example of an electrical terminal applicator for the press.
Figure 12:
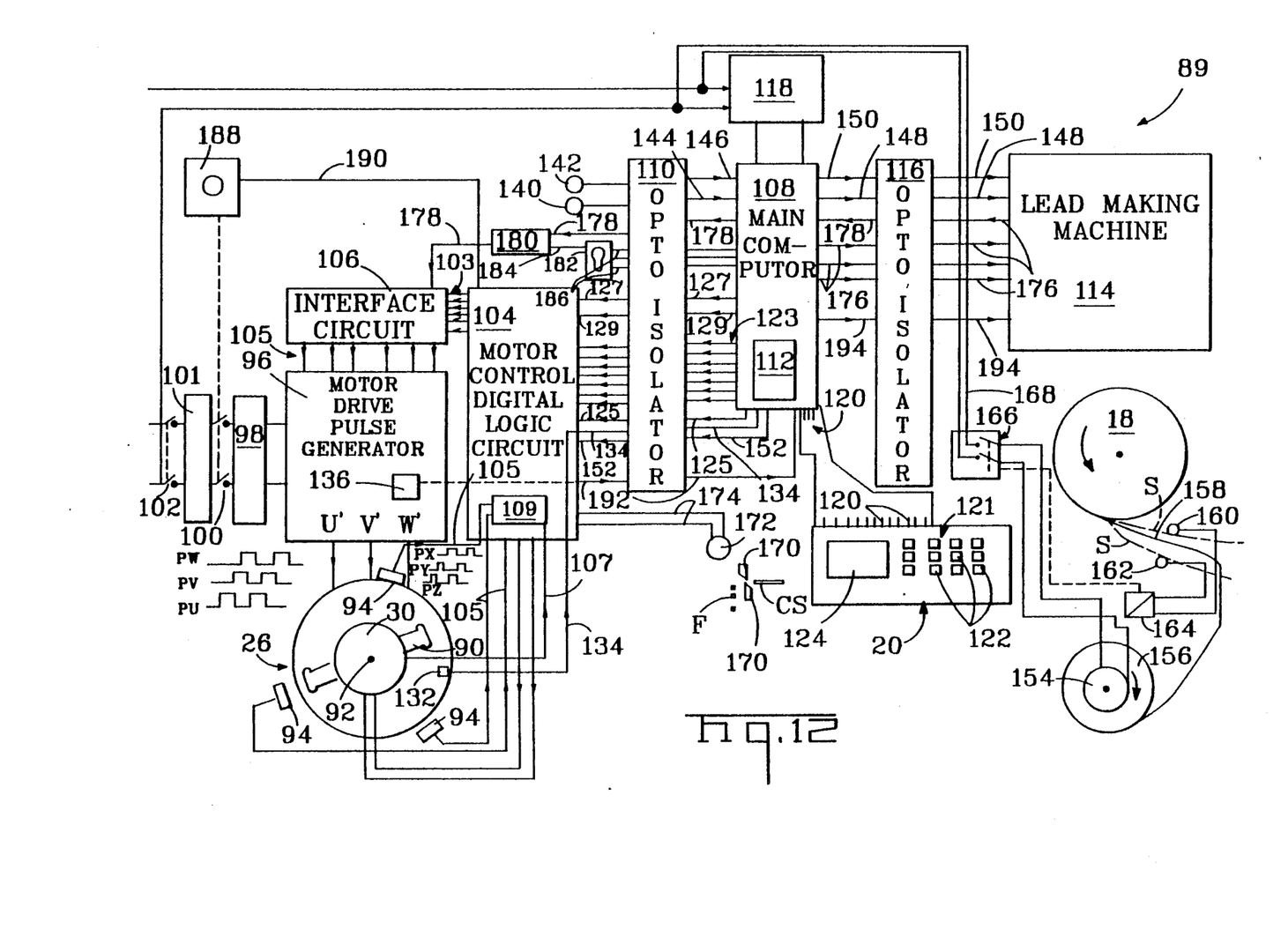
FIG. 12 is a block schematic diagram illustrating an electronic control circuit arrangement for the press and for a lead making machine.

An electronically controlled crimping press 2, comprises, a cast metal frame 4 having a generally rectangular ram drive housing 6, a pedestal 8 formed integrally therewith, and an applicator mounting base 10 formed integrally with the pedestal 8, mounting lugs 12 projecting from opposite sides of the latter. There projects from the rear of the housing 4, as shown in FIG. 7, a lug 14 supporting a vertical shaft 16 carrying a rotatable storage reel 18, part of which is shown in FIG. 1, and about which is wound strip S (FIG. 11) of electrical terminals T. Secured to one side of the housing 6, is a control panel 20, for use in operating an electronic control circuit, which is described below and which is shown in FIG. 12. Arranged for vertical, reciprocating, sliding movement, in the forward part of the housing 6, is a slide ram 22, which is connected, as best seen in FIG. 2, by way of a reduction gear box 24, to a three-phase, brushless, maintenance free, DC synchronous electric motor 26. The motor 26 is mounted in the housing 6 with considerable clearance from its side walls 28, in which are provided louvers 31 for augmented ventilation of the motor 26. There is connected to the output shaft of the motor 26, at the opposite end of the shaft to the gear box 24, an incremental encoder 30 fixed to the motor 26. The gear box 24 is secured to the side walls 28 by means of screws 88.

Figure 6:
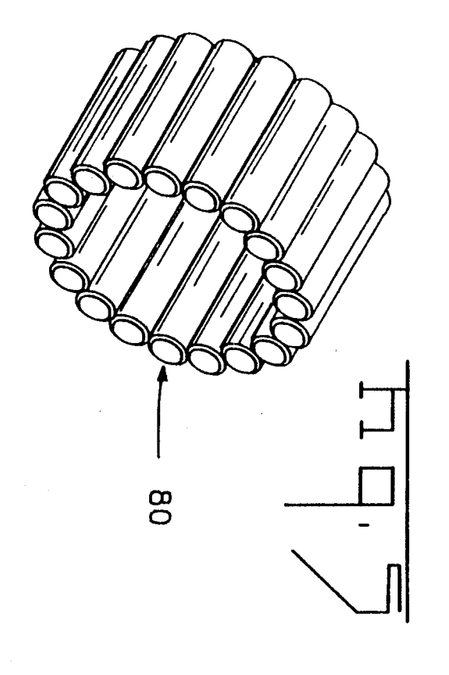
FIG. 6 is an enlarged elevational view, shown partly in section, of the lower part of the press shown in FIG. 1 and having fixed thereto a mounting plate for an electrical terminal applicator.

As shown in FIG. 6, an applicator mounting plate 32 provided with applicator mounting lugs 34 is secured to the base 10 by means of screws 36. The slide ram 22 is provided at its lower end with an adaptor 40 for releasably securing the ram 22, as shown in FIG. 7, to a complementary adaptor 42 of an electrical terminal applicator 44, an example of which is shown in FIG. 11. The applicator shown in FIG. 11 is an end feed applicator, comprising a ram housing 46 containing an applicator ram 47 terminating at its upper end in the adaptor 42 and at its lower end, in terminal crimping dies 48. The applicator 44 has a terminal strip feeding device 50 for the strip S, comprising a feed finger 52 arranged to be driven in reciprocating motion by means of a piston and cylinder unit 54 to drive the strip S of electrical terminals along a feed track 56 towards a terminal crimping anvil 58 on an applicator base 60 adapted to be secured to the plate 32 by means of the lugs 34. Such an applicator is described, for example, in U.S. Pat. No. 3,184,950, which is incorporated herein by reference.

Figure 3:
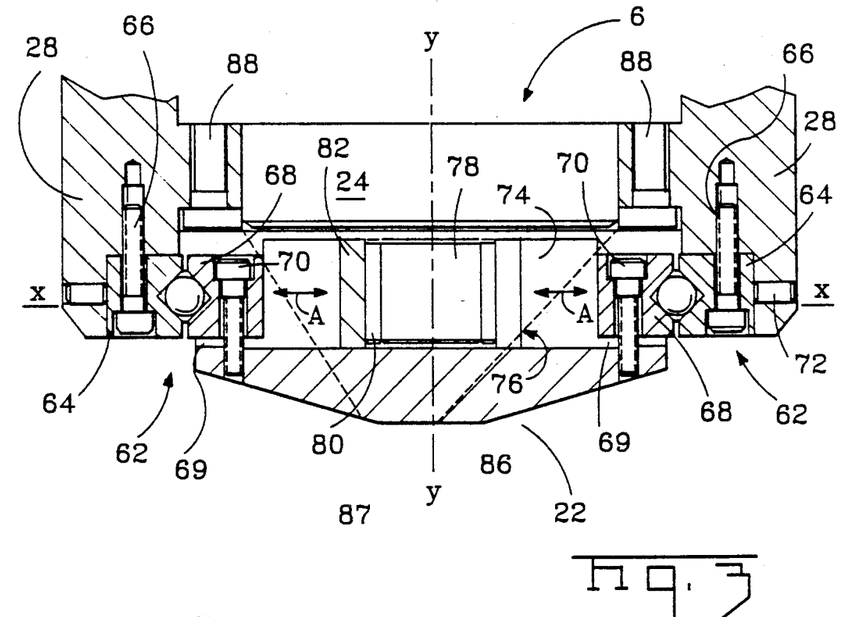
FIG. 3 is an enlarged fragmentary view illustrating details of FIG. 2.
Figure 8:
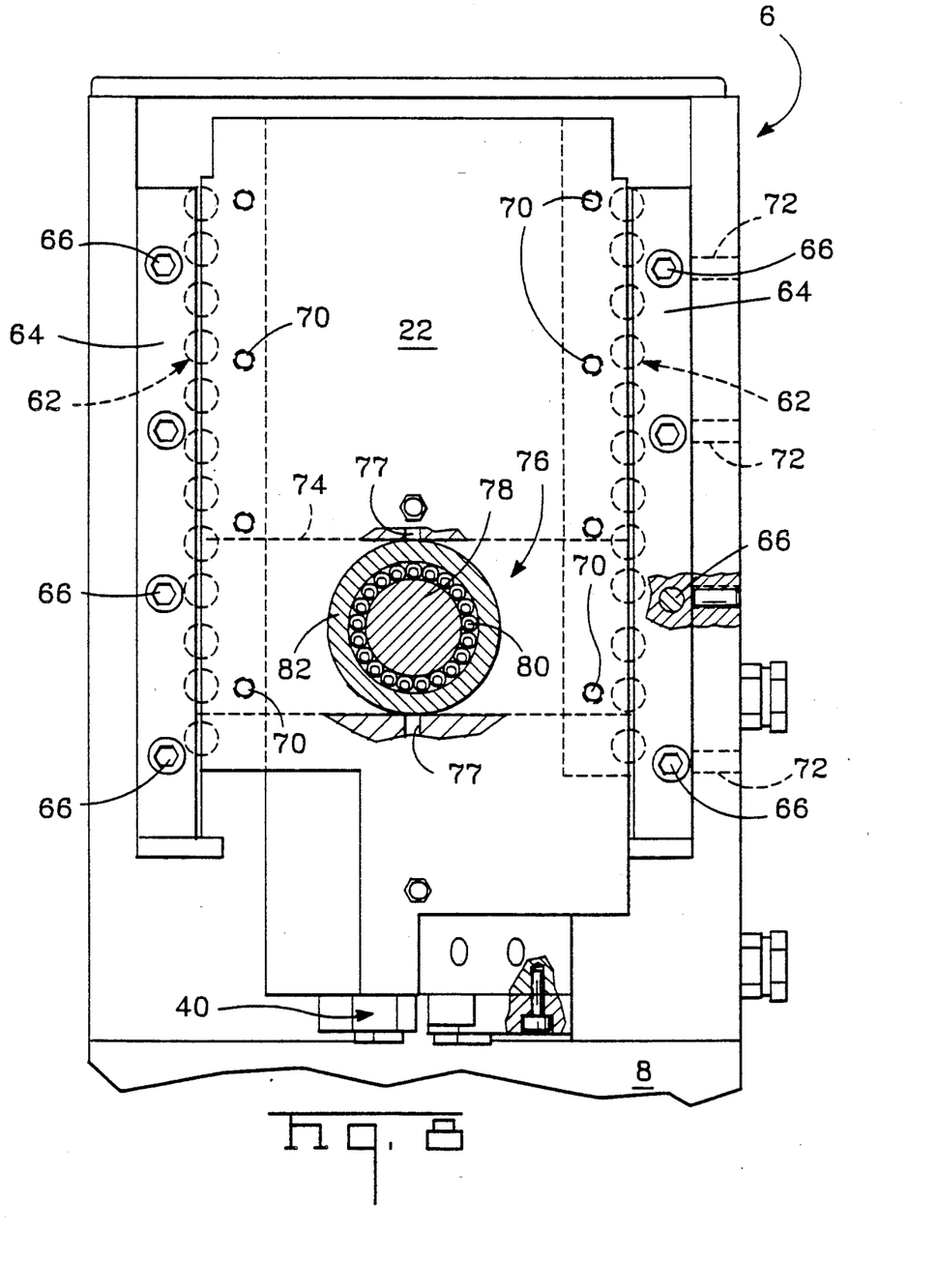
FIG. 8 is an enlarged front view, shown partly in section, of the upper part of the press.
Figures 9, 10:
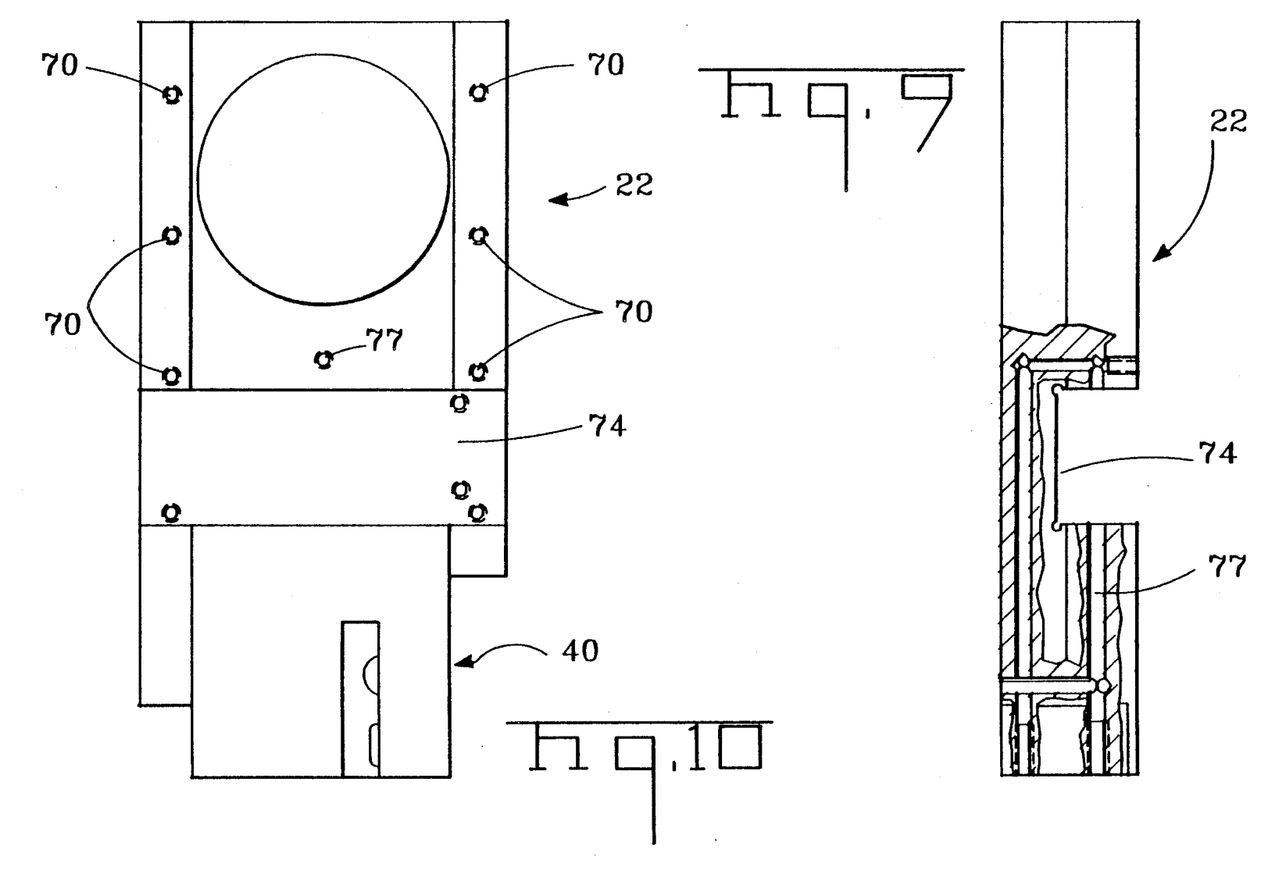
FIG. 9 is an enlarged side view, shown partly in section, of the slide ram.
FIG. 10 is an enlarged front view of the slide ram.
Figure 14:
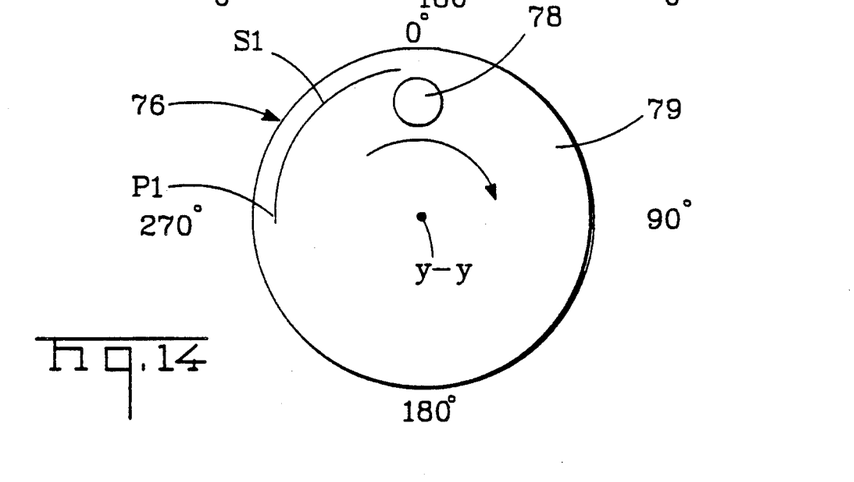
FIG. 14 is a diagram of an eccentric assembly of the press, associated with the graph of FIG. 13.

The ram 22 is mounted to the side walls 28 of the housing 6 by way of roller or ball bearings 62 comprising outer tracks 64 secured to the side walls 28 by means of screws 66, as best seen in FIG. 3, and inner tracks 68 secured to lugs 69 extending along vertical margins of the ram 22 by means of screws 70. The track 64 on one side wall 68 is laterally adjustable by means of grub screws 72, as will best be appreciated from FIG. 8. As best seen in FIG. 3, the ram 22 is mounted in the bearings 62 bisected by its transverse, or horizontal, central axis X-X so that it does not tend to tilt forwardly or rearwardly during its vertical, reciprocating, sliding movement on the bearings 62. As best seen in FIGS. 9 and 10, the ram 22 is formed with a substantially rectangular cross section, elongate guideway 74 opening into its rear face only, extending horizontally, thereacross parallel to the axis X-X and which guideway 74 receives an eccentric assembly 76 for horizontal reciprocating movement as indicated by the arrows A, in FIG. 3, at right angles to the axis of rotation Y-Y of the shaft of the motor 26, which axis is at right angles to the axis X-X. The ram 22 is formed with channels 77 for oil for lubricating the guideway 74 and the bearings 62. The eccentric assembly 76, comprises a central stub shaft 78 which is mounted for rotation about its axis in a roller bearing ring 80 which is best seen in FIG. 5 and which is in turn mounted in a circular cross section bearing block 82 in the form of a roller, which is best seen in FIG. 8. The shaft 78, is arranged to be driven in rotation by reduction gearing (not shown) in the gearbox 24, and is mounted to an output shaft 79 thereof (as best seen in FIGS. 4 and 14), eccentrically with respect to said axis Y-Y which is also the axis of rotation of the output shaft 79.

Figure 4:
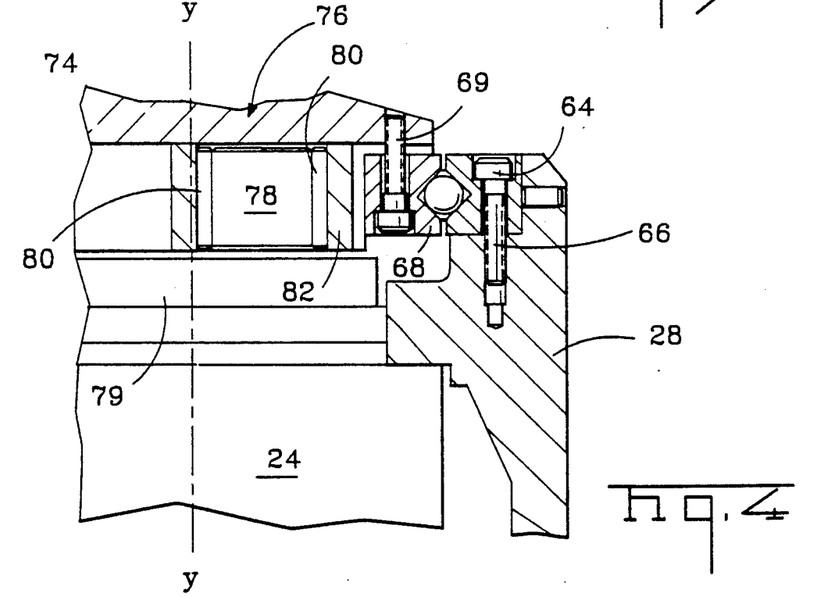
FIG. 4 is an enlarged fragmentary, sectional view of the press, showing the slide ram in an intermediate position.

As the shaft 78 is rotated by the motor 25 by way of the reduction gear box 24, assembly 76 drives the ram 22 through its vertical, reciprocating motion, the eccentricity of the assembly 76 being taken up by rolling movement thereof along the guideway 74; as will be apparent from a comparison of FIGS. 2 and 3, in which the ram 22 is in its fully raised, or home, position, with FIG. 4 in which the ram 22 is in an intermediate position. Thus when the applicator 44 is mounted to the press 2, in the manner described above, the crimping (die 48 of the applicator 44 is driven by the ram 22 in reciprocating motion to crimp terminals T to leads inserted between the die 48 and the anvil 58. The encoder 30, serves incrementally to measure the angular position of the shaft 78 and thus the vertical position of the ram 22, which is driven through one cycle of its reciprocating movement during each revolution of the shaft 78. The bearing block could be of rectangular, instead of circular, cross-section, arranged to slide, instead of roll, along the guideway 74.

It is important that the press ram 22 should be returned to its home position, that is to say to its fully raised position (0° in FIG. 14), with reasonable precision following each cycle its reciprocating movement because part, for example the feed finger, of an applicator on the plate 32, driven according to the vertical position the applicator ram will be incorrectly synchronized with the end positions of the applicator ram should the latter either overshoot, or undershoot with respect to its home position at the end of a crimping cycle. Also a significant overshoot of the ram 22, could cause the applicator ram to obstruct the insertion of a lead between the crimping die and the crimping anvil of the applicator, at the beginning of a crimping cycle. Proper return of the press ram 22 to its home position at the end of a cycle, is of enhanced importance where the applicator is part of a lead making machine having automatic lead insertion means which must be synchronized with the cycle of the applicator ram. Again, where the applicator is a stripper crimper, stripping means thereof must also be coordinated with the movement of the applicator ram.

Figure 13:
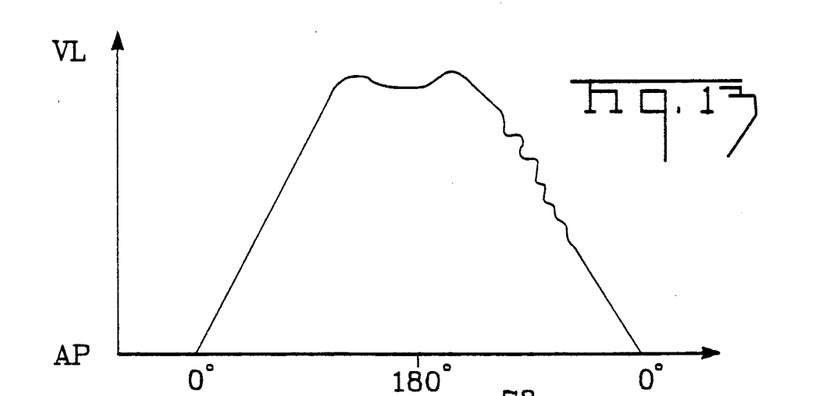
FIG. 13 is a graph illustrating the operation of the control circuit arrangement.

A circuit arrangement 89, for controlling the press 2, so that the ram 22 returns, with the required accuracy, to its top dead center, or home, position at the end of each cycle of the press, and for controlling the operation of auxiliary means of an applicator of the press and associated parts of a lead making machine of which the press is part, will now be described with a particular reference to FIGS. 12 to 14.

As shown in FIG. 12, the motor 26 which as mentioned above, is a maintenance free, brushless, three phase, synchronous, DC motor, comprises a permanent magnet 90, which is fixed to shaft 92 of the motor 26 and which is rotated by the field coils (not shown) thereof which are fed with phased DC pulses, PU, PV and PW, respectively, the speed of the motor 26 being a function of the pulse frequency. The magnet 90 cooperates with Hall effect sensors 94 each of which produces a pulse train PX, PY and PZ, respectively, the pulse frequency of which is a function of the speed rotation of the shaft 92, that is to say the motor speed. Three inlets U', V' and W', of the motor 26 are supplied with the pulses PU, PV and PW, respectively by a motor drive pulse generator 96 fed with direct current via a rectifying and smoothing circuit 98 connected via a ganged switch 100 to an alternating current filter 101 which is in turn connected to AC mains voltage by a further ganged switch 102. The motor drive pulse generator 96 is controlled via lines 103 and 105 by a motor control digital logic circuit 104, by way of an interface circuit 106, to vary the frequency of, or reverse the polarity of, the pulses PU, PV and PW or to supply a continuous pulse to a phase of the motor 26 to hold it stationary. The circuit 104 is connected to a main computer 108 by way of a first optoisolator 110, the computer 108 having entered therein a desired motor speed program 112. The computer 108 is also connected to a lead making machine 114 by way of a second optoisolator 116, in which machine the press 2 is incorporated. The computer 108 is supplied from the AC mains by way of a rectifier and voltage changer 118 and is also connected to the control panel 20 by way of an array of lines 120.

Both the sensors 94, and the incremental encoder 30 are connected to the motor control circuit 104 by way of lines 105 and 107, respectively. The circuit 104 comprises a comparator 109 which compares the outputs on the lines 105 and 107 which represent the speed of the motor 26 and the angular position of its shaft 92, respectively, with the desired motor speed registered in the program 112, the speed of the motor 26 being controlled by the circuit 104 by way of the pulse generator 96 upon the basis of such comparison. In theory, the motor 26 could be brought to a halt when the ram 22 is in its top dead center, or home position, only by comparison of the output of the sensors 94 with the program 112, but this could not be achieved with reasonable accuracy in practice by means of a circuit 104 of a kind which can be produced commercially at a reasonable cost. In the present case, however, the speed of the motor 26 as controlled upon the basis of a comparison between the program 12 and the frequency of the pulses PX, PY and PZ, tends to hunt, that is to say it becomes unstable, as the ram 22 is moved towards its home position. At this stage however, the signals supplied by the incremental encoder 30 are effective in the circuit 104 to supply control signals to the pulse generator 96 continually to return the motor 26 to the desired speed stipulated by the program 112. FIG. 13 is a graph in which the ordinate represents the motor speed VL, and the abscissa, the angular position AP of the shaft 78. It will be seen from the graph that as the ram 22 descends towards the fully depressed position, that is to say the position at which the applicator ram crimps the terminal to the lead, the speed of the motor 26 rises linearly up to a point proximate to the 180° position of the shaft 78 and falls slightly as the crimping operation is carried out around that position. Thereafter the motor speed rises slightly and then falls again, as the shaft 78 moves towards its home position. As shown in FIG. 13, the encoder 30 serves to linearlise the speed of the motor 26 between approximately the 200° to 300° angular positions the shaft 78. Lines 123 connecting the program 112 to the circuit 104, by way of the optoisolator 110 continually feed into the circuit 104, the desired motor speed criteria for different angular positions of the shaft 78.

The control panel 20 is provided with a bank 121 of touch screens 122, and an indicator screen 124 on which the computer causes to be displayed operating information for example that the press is ready for use or that there is a fault in a particular part of the system.

The motor 26 is controlled throughout its rotation in order to halt the ram 22 when it is at least approximately in its home position, at which time the circuit 104 signals the pulse generator 96 to reverse the polarity of the pulses PU, PV and PW, no specific brake means for the motor 26 being needed. Respective ones of the touch screens 122 may be actuable by the operator to cause the computer 108 to signal the pulse generator 96 by way of the control circuit 104 to the following ends, for example: to start the motor 26; to stop the motor 26 by momentarily reversing the current supply thereto; to hold the motor 26 in its stopped position by applying a continuous current to one of its phases; to reverse the motor 26 to clear a jammed terminal; or to cause the motor 26 to crawl forwardly and rearwardly, by applying its feed pulses at reduced frequency in the appropriate senses, when the press is being set up.

The sense of rotation, of the motor 26 is controlled by way of lines 125 between the computer !08 and the circuit 104, the motor 26 is held in its stopped position by signals applied by the computer 108 to lines 127 between the computer 108 and the circuit 104 and the motor 26 is controlled to crawl by way of lines 129 between the computer 108 and the circuit 104.

A clock pulse line 134 is provided between the computer 108 and the control circuit 104 for the transmission of pulses for synchronizing the computer 108 therewith so that the pulse generator 96 is signalled to control the motor 26, only with a rapidity which is compatible with the following capacity of the motor 26. The motor 26 is provided with a temperature sensor 132, connected via lines 134 to the computer 108 to cause it to actuate the circuit 104 and hence the pulse generator 96, stop the motor 26 when its temperature exceeds a predetermined threshold. The pulse generator 96 also has a temperature sensor 136 connected to the line 134 so that the motor 26 is stopped should the generator 96 become overheated.

When a strip of terminals is being manufactured, by means of a usual progressive strip forming process, the forming process may comprise means for removing from the strip, any terminal which has been found by sensing means of the forming press to be defective. For this reason, the strip of terminals on the reel 18 of the press 2 may have had one or more terminals removed therefrom, so that no terminal may be present on the anvil during a particular cycle of the applicator ram. If the lead making machine presents a lead to the applicator when no terminal is present on its anvil, then that lead will be wasted for this reason, the circuit arrangement 89 is provided with missing terminal sensors 140 and 142 for end strip terminals and side strip terminals respectively, which sensors are connected to the computer 108 by lines 144 and 146 respectively, by way of the optoisolator 110. If a missing terminal is detected upstream of the anvil, the main computer 108 signals the lead presenting means of the lead making machine 114, via lines 148 or 150, as the case may be, and the optoisolator 116, to dwell during one cycle of operation so that no lead is presented to the applicator when there is no terminal on its anvil. The computer 108 also signals the press 2, to carry out an extra cycle during the dwell period of the lead presenting means, by way of lines 152, the optoisolator 110, the circuit 104 and the pulse generator 96, so that the feed finger of the applicator places the next following terminal of the strip on the anvil at the proper time.

The force required to turn the reel 18 of the press 2, varies as a function of the length of the terminal strip T that remains thereon, so that the force with which the feed finger of the applicator must advance the strip will similarly vary, whereby a terminal may be incorrectly positioned on the anvil, as a result of such variation. To avoid this disadvantage, the applicator is provided with an electric motor 154 arranged to rotate a spool 156 to take up a length of interleaving paper 158 with which the turns of a strip of terminals on a reel are customary separated. As the length of paper is taken up, the part of the strip of terminals extending from the reel 18 towards the applicator is caused to sag slightly thereby to relieve the force that the feed finger needs to exert against the strip to advance it towards the anvil of the applicator. Strip sensors 160 and 162 are provided, for sensing the position of said part of the strip of terminals order to avoid over-winding the paper length by the motor 154. When the feed finger of the applicator has taken up the terminal strip S to an extent that said part thereof becomes taut said part thereof engages the sensor 160, which actuates a relay 164 to close a switch 166 to connect the motor 154 to the main supply, via lines 168.

The motor accordingly starts and rotates the reel 18 by pulling on the paper length 158 until said part of the terminal strip sags to an extent to activate the sensor 162 which actuates the relay 164 to open the switch 166 to stop the motor 154.

When the terminals T are arranged in side or ladder strip form as shown in FIG. 11, the terminals T of the strip S are connected to each other by carrier strips CS, from which the applicator shears a terminal T during each crimping operation. The carrier strips CS from which the terminals are shared are waste, and shear blades 170, driven by an electric motor 172, are provided for shearing the waste strips CS into easily disposable fragments F. If, however, the terminals are in end to end strip form, the applicator only shears out slugs connecting the terminals of the strip, so that the blades 70 are not needed. One of the touch screens 122 is therefore actuable to instruct the computer 108 to bring the motor 172 into operation if, and when, it is needed, by way of the optoisolator 110, and the motor control circuit 104 to which the motor 172 is connected by way of lines 174.

Others of the touch screens 122 are actuable to control parts of, or peripheral equipment of, the lead making machine 114, in light of a particular lead making program, by way of the computer 108, lines 176 and the optoisolator 116, for example to allow for the type of applicator to be used, for example a stripper crimper, or an end feed or a side feed applicator.

At least one set of lines 178 is provided, running from the lead making machine 114 by way of the optoisolator 116, the computer 108, the optoisolator 110, a further optoisolator 180 and the interface circuit 106, to the pulse generator 96 for disabling the pulse generator 96 in the event of a fault, for example a terminal strip fault, or press breakdown.

A key operated shut-down switch 182 is connected to the optoisolator 180 by a line 184, and to the computer 108 via the optoisolator 110, by lines 186, for disabling both the pulse generator 96 and the computer 108 whilst leaving its program 112 intact, however. A guard operated switch 188, connected to the motor control circuit 104 by way of a line 190 is provided for opening the switch 100 to cut-off power to the pulse generator 96, should a guard (not shown) of the press, be opened.

The control circuit 104 is arranged to signal the computer 108 via the optoisolator 116, by way of lines 192 when the eccentric assembly 76 has reached a point P1 (FIG. 14) spaced angularly from the home position, 0°, of the ram 22, for example by 90°, to cause the computer 108, in turn to signal the lead making machine 114, by way of the optoisolator 116 and lines 194 to cause the lead presenting means thereof to withdraw a terminated lead from between the dies and anvil of the applicator, thereby to increase the speed of operation of the lead making machine 114, by the length of a sector S1 of the press cycle, that is to say by as much as a quarter.

We claim:

1. A press comprising a direct current drive electric motor having an output shaft; a slide ram; means for guiding the slide ram in reciprocating motion along a rectilinear path; reduction gearing and an eccentric drive shaft connecting the motor output shaft to the slide ram for driving the slide ram through cycles of reciprocating motion along said rectilinear path; and a control circuit arrangement comprising an encoder connected to the output shaft of the drive electric motor for producing a first output representing the angular position of the eccentric drive shaft and thus the linear position of the slide ram along said rectilinear path and means for controlling the speed of the drive motor to stop the slide ram at least proximate to a home position thereof at the end of each cycle of the slide ram; wherein the means for controlling the speed of the drive motor comprises a computer having registered therein a desired motor speed program, a motor control circuit electrically connected to the incremental encoder and to the computer, a motor drive circuit electrically connected to the motor control circuit and to the drive electric motor, and measuring means associated with the drive electric motor and being electrically connected to the motor control circuit, which measuring means produces a continuous second output representing the speed of the drive electric motor, the motor control circuit receiving and comparing said first and second outputs with said desired motor speed program to provide a third output representing the result of such comparison, said motor drive circuit being responsive to said third output to control the speed of said motor in accordance with the desired motor speed program.

2. A press according to claim 1, wherein the drive motor is a phased pulse-fed, brushless, synchronous motor, said measuring means comprising Hall effect sensors for producing first pulse trains, the first pulse trains being electrically fed to the motor control circuit and compared with the desired motor speed program, the speed of the drive motor being controlled by second pulse trains fed to the drive motor by the motor drive circuit and the frequency of which second pulse trains is determined by the comparison of the frequency of the said pulse trains and the program.

3. A press according to claim 2 wherein a control panel connected to the computer and having switch means actuable to cause the computer to signal the motor control circuit to actuate the motor drive circuit to apply a single continuous pulse to a phase of the drive motor, to hold it in a stopped position.

4. A press according to claim 2 wherein the motor drive circuit is actuable to supply feed pulses to the drive motor in first and second senses, a control panel connected to the computer having switch means actuable to cause the computer to signal the motor control circuit to actuate the motor drive circuit to apply feed pulses to the motor at reduced frequency and in said first and second senses sequentially to cause the motor to crawl forwardly and rearwardly at reduced speed.

5. A press according to claim 2, wherein means are provided for transmitting clock pulses to synchronize the motor control circuit with the computer so that the motor control circuit can supply control signals to the motor drive circuit only with a rapidity which is compatible with the capacity of the drive motor to respond to variations in the pulse frequency of said pulse trains.

6. A press according to claim 1, wherein the motor drive circuit is actuable to supply feed current to the drive motor in first and second senses and the motor control circuit is arranged to actuate the motor drive circuit to reverse the sense of the feed current supply to the drive motor to stop it in accordance with the motor speed program.

7. A press according to claim 1 wherein as the slide ram is being returned by the drive motor to its home position following a working stroke of the ram, said first output is effective to cause the motor control circuit to supply control signals to the motor drive circuit continuously to return the motor to a desired speed stipulated by the desired motor speed program.

8. A press according to claim 1 wherein the drive motor is provided with a temperature sensor connected to the computer to cause it to actuate the motor control circuit to stop the motor when the temperature of the motor exceeds a predetermined threshold temperature.

9. A press according to claim 1, wherein a key operated shut-down switch connected to the computer and to the motor drive circuit is actuable to disable the motor drive circuit and the computer whilst leaving its program intact.

* * * * *